United States Patent Office 2,854,779
Patented Oct. 7, 1958

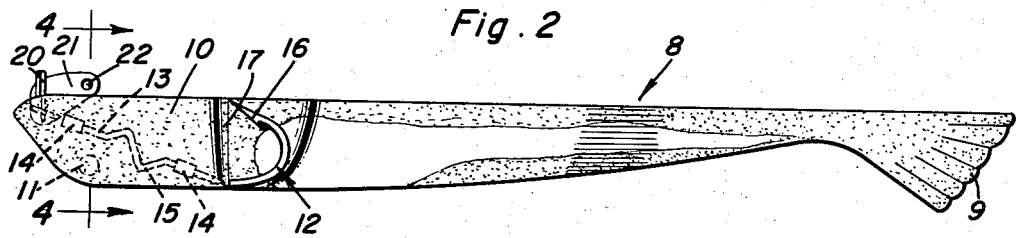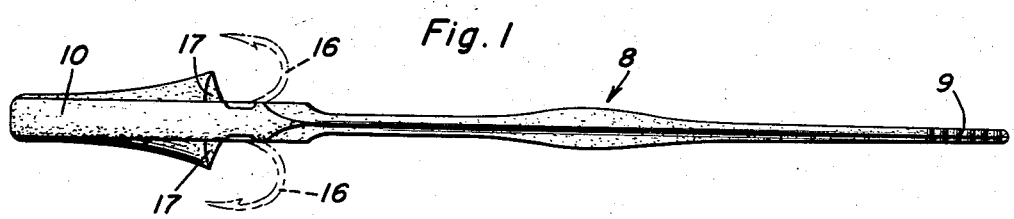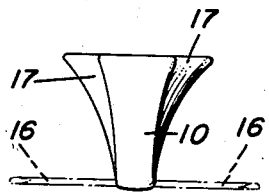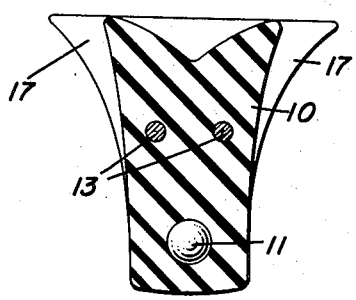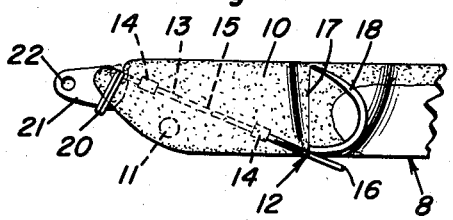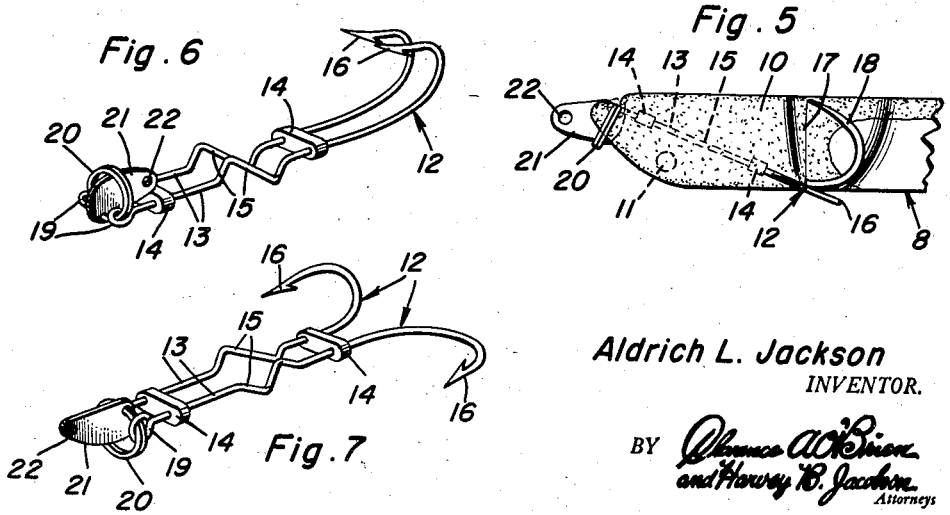
Aldrich L. Jackson
INVENTOR.

2,854,779

ARTIFICIAL FISH BAIT

Aldrich L. Jackson, Eustis, Fla., assignor to Arthur P. Hutt, Eustis, Fla.

Application December 19, 1956, Serial No. 629,416

5 Claims. (Cl. 43—37)

The present invention relates to new and useful improvements in artificial fish baits or lures and has for one of its important objects to provide, in a manner as hereinafter set forth, an article of this character comprising a unique construction and arrangement of substantially concealed trap hooks for positively preventing the escape of the fish once it has struck.

Another very important object of the invention is to provide a bait or lure of the aforementioned character including novel means for operating the hooks.

Still another important object of the invention is to provide a bait or lure of the character described which will be substantially weedless, snag-proof and have a highly life-like appearance, feel and action in the water.

Other objects of the invention are to provide an artificial fish bait or lure of the character set forth which will be comparatively simple in construction, durable, highly reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a plan view of an artificial bait or lure constructed in accordance with the present invention;

Figure 2 is a view in side elevation thereof;

Figure 3 is a front elevational view;

Figure 4 is a view in transverse section, taken substantially on the line 4—4 of Figure 2;

Figure 5 is a view in side elevation of the forward end portion of the device, showing the hooks in open or operative position;

Figure 6 is a detail view in perspective of the hooks, showing same in closed or inoperative position; and Figure 7 is a perspective view substantially similar to Figure 6 but showing the hooks in open or operative position.

Referring now to the drawing in detail, it will be seen that the embodiment of the invention which has been illustrated comprises an elongated body which is designated generally by reference character 8. The body 8, which may be of any desired dimensions, is of a suitable flexible, soft flesh-like plastic impregnated with a scent and taste compound. Also, the body 8 may be suitably colored and ornamented, if desired.

At its rear end, the body 8 terminates in an integral tail 9. The body 8 is provided on its forward end with a resilient member or head 10. The head 10 is weighted by shot 11 molded therein.

Molded substantially longitudinally in the elongated head 10 is a pair of downwardly and rearwardly inclined, spaced, parallel hooks 12. The hooks 12 comprise shanks 13 journaled in spacers 14 molded transversely in the head 10 at longitudinally spaced points. The shanks 13 include crimped or humped intermediate portions 15 molded in the resilient head 10 which yieldingly resists rotation of the hooks 12 and returns said hooks to folded, closed or inoperative position. At one end, the shanks 13 terminate in barbed bills 16 which emerge from the rear end of the head 10 behind the gills 17 thereof and normally lie closely against the sides of the forward end portion of the body 8 in arcuate grooves 18 (see Figure 5) which are provided therefor.

The shanks 13 of the hooks 12 terminate at their other or forward ends in eyes 19 which normally lie flat in substantially the same horizontal plane. Mounted in the eyes 19 is a ring cam 20 and an operating lever 21 of substantially the shape shown. The free end portion of the lever 21 is apertured, as at 22, for connecting a line (not shown) thereto.

It is thought that the use of the bait or lure will be readily apparent from a consideration of the foregoing. Briefly, the trap hooks 12 normally occupy the position shown to advantage in Figures 2 and 6 of the drawing. In this position the hooks 12 are inconspicuous and shielded, thus rendering the bait substantially weedless and snag-proof. When a strike is had the lure is taken into the mouth of the fish with the hooks in closed position. After the lure has been thus taken in the fisherman, when he so desires, yanks or jerks the line thus swinging the lever 21 forwardly and downwardly from the position of Figures 2 and 6 of the drawing to that of Figures 5 and 7 of said drawing. Thus, the ring cam 20 is swung downwardly and snaps past dead center in the eyes 19 for rotating the shanks 13 with the crimped portions 15 thereof in the head 10 against the tension of the resilient material of said head thereby opening or spreading the bills 16 of the hooks and setting said hooks firmly in the fish. If desired, the fisherman may, when fishing in weedless or snagless water, snap the ring cam 20 past dead center and use the lure with the hooks 12 locked in open position, this constituting a highly important and desirable feature of the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed. For instance, the head 10 and the body 11 may be of different and various suitable materials which may be molded, attached or connected in any desired manner. Also, the body 8, which may be long or short, may be dispensed with.

What is claimed as new is as follows:

1. An artificial fish bait of the character described comprising: an elongated resilient body, an integral head on one end of said body, a pair of spaced, parallel hooks molded longitudinally in said head, said hooks comprising bills emerging from the head at the rear thereof and adapted for side abutting engagement with the body when in inoperative position, and means for rotating the hooks to operative position, each hook embodying a shank embedded in the head and an eye on one end of said shank, said means including a ring cam mounted in the eyes, and an operating lever journaled on said ring cam between the eyes.

2. An artificial fishing bait comprising a lure having an elastic head, a pair of fish hooks each having a shank with an eye at the forward end, a barbed hook at the rearward end and crimps on its median portion, said fish hooks being embedded in the elastic material from which said head is formed, the crimped shanks and eyes being embedded with the hooks exposed so that they may be projected and retracted, the inherent yieldable properties of the elastic material having the function of a return spring and serving to maintain constantly responsive pressure on the crimps in a manner to retract and retain said hooks in readiness to be swung out and projected to assume open trapping positions relative to cooperating surfaces of said head, and line actuated means embedded in said head and mechanically joined with said eyes in a manner to angularly twist the eyes toward and from each other and to consequently rotate the shanks and hooks.

3. The structure defined in claim 2, and wherein said means embodies a ring linking the eyes together and means for operatively connecting a fishing line to said ring.

4. The structure defined in claim 3, and wherein said last named means comprises a lever having an apertured end portion pivotally joined to a portion of the ring and operable between said eyes.

5. An artificial fishing bait comprising a lure having an elongated flimsy elastic body with a head at one end of the body and cooperating therewith in defining an imitation eel, said head being of compressibly resilient rubber, a pair of longitudinally spaced transversely disposed spacer members embedded in said head and provided with bearings, a first fishhook embodying a shank having a barbed hook at one end and an eye at the other end, longitudinally spaced portions of said fishhook being mounted for rotation in bearings provided therefor in said spacer members, a second fishhook disposed in spaced parallelism with respect to said first named fishhook and also having a shank, a barbed hook at one end and an eye at the other end, portions of said shank being journalled for limited angular rotation in bearings provided therefor in said spacer members and their respective shanks being disposed in parallelism, portions of the shanks between the spacer members having bent portions defining cooperating kinks, portions of the rubber embracing said kinks being of a degree of elasticity that by imparting movement to the respective eyes it becomes possible to rotate the shanks and either project or retract the barbed hooks, said hooks being disposed in positions exteriorly of adjacent portions of the head, a lever to which one end of a fishing line may be connected and cam means having a cam cooperating connection with the respective eyes, said lever being pivotally connected to said cam means and situated between said eyes.

References Cited in the file of this patent

UNITED STATES PATENTS

| | | |
|---|---|---|
| 446,827 | Cass | Feb. 17, 1891 |
| 2,572,535 | Tacket | Oct. 23, 1951 |
| 2,691,841 | Daniel | Oct. 19, 1954 |